United States Patent [19]
Martin

[11] 3,900,313
[45] Aug. 19, 1975

[54] PROCESS FOR PRODUCING DIE-CASTING ALLOYS FROM ALUMINUM SCRAP

[76] Inventor: Hubert Martin, 4720 Shoremeade Rd., Richmond, Va. 23234

[22] Filed: Feb. 2, 1973

[21] Appl. No.: 329,143

Related U.S. Application Data

[63] Continuation-in-part of Ser. No. 289,597, Sept. 18, 1972, abandoned.

[52] U.S. Cl. .................... 75/68 R; 75/63; 423/344
[51] Int. Cl. .............................................. C22b 21/06
[58] Field of Search ............ 75/44 S, 63, 68 R, 135, 75/148; 423/344

[56] References Cited
UNITED STATES PATENTS
1,972,432  9/1934  Grisewald et al. .................... 75/148
2,704,249  3/1955  Mushovic ............................... 75/63
3,677,742  7/1972  Toth ..................................... 75/68 R

*Primary Examiner*—L. Dewayne Rutledge
*Assistant Examiner*—M. J. Andrews

[57] ABSTRACT

Process for producing die-casting alloys from aluminum scrap by dissolving silicon in the scrap melt, cooling the melt to precipitate second-phase particles, coarsening the precipitated second-phase particles and separating them from the liquid near the eutectic AlSi temperature.

5 Claims, No Drawings

PROCESS FOR PRODUCING DIE-CASTING ALLOYS FROM ALUMINUM SCRAP

This application is a continuation-in-part of application Ser. No. 289,597, filed Sept. 18, 1972 now abandoned.

This invention relates to a process to convert aluminum scrap containing a high percentage of one or more undesirable elements into good-quality aluminum die-casting alloys. "Aluminum scrap" as used herein refers to alloys containing at least 70% aluminum but which cannot be used commercially in large quantities because of their excessive content of one or more impurities such as iron, copper, manganese, titanium, calcium, chromium, phosphorus, zinc, nickel, and of other less common substances. The present process provides a novel, economical method to remove excess iron and other elements from aluminum scrap without introducing other undesirable elements, physical properties, or impurities. The basic raw material of the invention can be waste materials of any sort having aluminum-containing pieces capable of being separated by conventional means as crude aluminum scrap.

Impurities such as iron are undesirable because, if present in excess amounts, they form brittle intermetallic crystals in aluminum, resulting in reduced mechanical properties, poor corrosion resistance, etc. Die-casting aluminum alloys, however, generally require small amounts of iron, 0.60 to 1.20%, to minimize die wear. The detrimental effects of the brittle intermetallic constituents caused by this amount of iron are avoided due to the rapid solidification during die-casting and consequent formation of small, less harmful crystals.

An industrial society creates ever increasing amounts of aluminum scrap contaminated with undesirable elements. Motor pistons are an example, having steel rings and other non-aluminum parts attached to them, which, during remelting of the aluminum pistons contaminate the alloy excessively with iron and other elements. The situation is similar with aluminum recovered from household garbage. An economical scrap conversion process is, therefore, most desirable. Such a process has an additional ecological impact. To reduce aluminum newly from ores requires at least 6 KWH/lb while recovering aluminum from scrap requires less than 1 KWH/lb. Recycle processes such as the aluminum scrap conversion process conserve raw materials and energy.

At present, aluminum scrap with high iron content of more than 1.5% Fe is mostly used as a deoxidizer in the steel industry. Homeopathic dosages are also added to commercial aluminum alloys. The high iron content prevents its large-scale addition to the commercial alloys.

There is no commercially attractive method known in the aluminum industry to preferentially remove excess iron from aluminum scrap. A method practiced on a small scale is the socalled manganese treatment. About 2.5 times the amount of iron has to be added to the melt in the form of manganese. The manganese forms intermetallic crystals with the iron and the aluminum, which partly solidify during cooling before the remaining aluminum alloy solidifies. These crystals can be separated by conventional means like filtering or decantation from the remaining melt. However, the final amount of iron plus manganese remaining in the alloy equals about the original iron content. While the crystal shape of the iron-manganese intermetallics is more desirable than that of manganese-free iron crystals, they still are quite brittle and detrimental to the desired final properties of most aluminum alloys. The maximum manganese limits in the commonly used die-casting alloys 380, 384, and 390 are, therefore, set at 0.10% Mn. In addition, the manganese treatment is quite costly. For all these reasons the manganese treatment is practiced in very specialized cases only.

The primary object of the invention is to provide a novel process for producing die-casting alloys from aluminum scrap. It is a further object to provide such a process which is economical, and one which comprises the steps of removing major non-aluminum objects from a suitable raw material (if the raw material source is sufficiently crude to require this step), melting and adding no more than 20% silicon, cooling to produce intermetallic particles, coarsening these particles while, preferably, keeping them in suspension in the melt, and separating them from the still molten aluminum alloy. Other objects and advantages will become apparent to those skilled in the art from the following description of the best mode of carrying out the invention and examples thereof, appended claims, and accompanying drawing wherein FIG. 1 is a flow diagram of the preferred process of the invention.

In accordance with the invention as compared with the above-mentioned application, relatively low quantities of silicon are employed in the aluminum scrap melt, and the temperature range of the process need only be in the order of 730°–800° C rather than 1000° C and to cool slowly therefrom. Since less silicon is dissolved in the molten aluminum scrap and at lower temperatures, the heat energy requirements of the process are significantly lower.

According to the process, any aluminum scrap containing an excessive amount of an undesirable substance can be converted economically to high quality die-casting alloys, one per cent by weight or more usually being considered excessive for iron, other common undesirables as manganese, titanium, calcium, phosphorus, chromium, as well as others known in the art being excessive at even lower percentages. The initial process step is to eliminate non-aluminum objects if such a step is in fact necessary, depending on the raw material involved, paper, in trash for example, oil, steel parts, glass, etc., by conventional means like disassembling, magnetic separation, dehydration and burning of combustibles. Integral non-aluminum parts which cannot be removed beforehand are released during melting on the slope of a sweat furnace. The aluminum and/or alloy portion melts and flows into a furnace bed below the slope, while the remaining steel solid iron and other parts are periodically raked from the slope and furnace.

Once an aluminum scrap melt has been developed from the basic raw materials, silicon is added. As mentioned above, typical die-casting alloys contain sizable quantities of silicon, ranging from 7.5 to 20%; however, the majority have a silicon content near the eutectic AlSi composition, i.e., 11.7% Si. Therefore, the amount of silicon added will depend on the chemical composition of the molten aluminum scrap. There must be sufficient silicon dissolved in the molten aluminum scrap to satisfy, during subsequent cooling the formation of intermetallics with the undesirable substances to be removed and yet saturate the desirable portion to be derived with the silicon content required for at least a eutectic or slightly hypereutectic AlSi alloy composition, i.e., at least 11.7% Si. The melt with silicon added is maintained at a high enough temperature and for sufficient time to insure adequate dissolution of the silicon which has a heat of fusion 4.6 times that of aluminum. By suitable measurement, silicon already present in the molten aluminum scrap is taken into consideration before adding the other silicon. So, the quantity of silicon added equals the amount needed to bind the undesirable elements in the melt through intermetallic particle formation and to supply the desired percentage of silicon for a eutectic or slightly overeutectic AlSi alloy composition, less the amount of silicon already present in the original scrap alloy.

Dissolving of the silicon addition has to be completed. For this purpose it is advisable to raise the melt temperature significantly above 690° C, i.e. the temperature at which, theoretically, about 18% Si can be dissolved in liquid aluminum. A good working temperature range is 750°–800° C, though other temperatures can be used as long as all silicon is readily dissolved. If less than 18% Si is required, the working temperature to dissolve the silicon can be lowered accordingly.

The purpose of adding silicon is threefold. It suppresses the solubility of other elements in aluminum so that these come out of solution during cooling of the melt and form solid particles. Secondly, the binary eutectic AlSi solidifies at 580° C, while pure aluminum solidifies at 660° C. Multiphase eutectic compositions with AlSi have still slightly lower eutectic temperatures. At the lower temperature of 580° C the solubility of many undesirable elements in liquid aluminum is further reduced since any solubility depends on the composition of the dissolving medium and on its temperature. Thirdly, silicon is a most desirable element in virtually all aluminum die-casting alloys.

The molten composition containing added silicon is cooled from its peak temperature to slightly above the eutectic temperature to allow precipitation of the intermediate crystals such as $TiSi_2$, $AlFeSi$, $TiB_2$, $(MnFe)Al_6$, $CaSi_2$, etc. The cooling is preferably carried out gradually, optimally at approximately 50° C per hour, or, if faster cooling is employed, with a holding period at slightly above the eutectic temperature to coarsen, or cause the growth of relatively large solid crystalline particles which can be readily separated from the aluminum-rich liquid. The crystals formed grow to appreciable sizes if cooling is gradual, or if the melt is held, after a rapid cool, for a minimum period of 15 minutes at 585°–595° C.

Separation can be carried out by filtration, centrifugation or decantation; however, it is a particular feature of the present invention to maintain the particles formed by cooling in suspension in the liquid phase, and while so maintaining the particles, separating the aluminum rich liquid with a filter centrifuge. This filter centrifugation with the particles suspended until separated on the filter material, is much more efficient than simple filtration, and permits the composition of the resulting desirable liquid to be carefully controlled and treated and cleaned from oxides, hydrogen and other substances immediately upon separation.

Separation is preferably carried out at a temperature slightly above the eutectic temperature of AlSiFe (580° C), 585°–610° for example, 595° C ± 5° for best results.

The invention is further illustrated by the following examples:

EXAMPLE I

After removal of moisture, flammables and other attached non-aluminum parts, charge aluminum scrap onto the slope of a sweat furnace operating at 750° C. Permit the aluminum alloy to melt and drip from the slope into the sweat furnace hearth. Residual non-aluminum parts, originally integral parts of the aluminum scrap, can be removed from the slope and from the furnace.

For a molten aluminum scrap alloy having a composition of 3.0% Fe, aluminum, and the remainder trace elements, add 13.7 percent silicon. Dissolve the silicon while maintaining the melt temperature for 2 hours at 750° C ± 20° C.

The melt is then transferred into a circular prehearth, cooled at an average rate of 50° C/hr. from 750° C to 590° C and kept at 590° C for 30 minutes. A graphite paddle, rotating slightly above the prehearth floor, is used to prevent precipitating iron-rich intermetallic crystals from settling to the bottom during the cooling and temperature stabilization periods. The paddle movement should, however, be slow so as to allow the suspended solid crystals to grow in size.

A continuous stream of melt with suspended iron-rich crystals can then be introduced into separation apparatus from which the desired die-casting alloy is obtained.

The aluminum rich product derived from the above will have a composition of about 12.3% Si, 0.8% Fe and 86.9% Al plus minor trace elements. The solid crystals mixed with some adhering aluminum alloy will analyze to approximately the following: 15.2% Si, 19.6% Fe and 65.2% Al plus trace elements. Per 100 parts of molten aluminum scrap alloy with silicon addition, about 86 parts of good die-casting alloy can be recovered as well as 8 parts of iron-rich residue, the remainder being melt loss.

EXAMPLE II

Molten scrap alloy has a composition of 3.4% Si, 5.5% Fe, 0.7% Cu, 0.4% Mn, 0.4% Mg, 0.9% Ti, 0.5% Ca, 88.2% Al plus trace elements.

Using the procedure described in Example I, for each 100 parts of molten aluminum scrap alloy add 15 parts of silicon and dissolve while keeping the melt for 2 hours at 750° C ± 20° C. The die-casting alloy derived will be approximately 12.4% Si, 0.4% Fe, 0.3% Mn, 0.8% Cu, 0.5% Mg, 0.1% Ti, 0.003% Ca, 85.5% Al plus trace elements. Approximately 70 parts of good die-casting alloy and 25 parts of impurity-rich residue can be obtained, the remainder being melt loss.

From the above examples it is apparent that the invention adds significantly to the recycling and upgrading of aluminum scrap to useful products, usually only derived from high-grade and newly produced aluminum.

In accordance with the invention, it is also possible to introduce an additive such as one or more alloying elements, at the time of silicon addition to the melt, or at any time prior to separation of the precipitated particles. For example, the additive can be a metallic substance which will provide desirable properties in the final die-casting alloy, and to precipitate even more of the undesirable elements in the form of solid crystalline particles.

The invention may be embodied in other specific forms without departing from the spirit or essential characteristics thereof. The present embodiments are, therefore, to be considered in all respects illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by the United States Letters Patent is:

1. A method for the conversion of scrap aluminum alloy to die-casting alloys, the scrap alloy containing at least 70 weight percent aluminum and one or more impurities in iron, titanium, calcium, manganese, copper, magnesium, zinc, nickel, chromium, phosphorus, comprising the steps of melting said scrap aluminum alloy, adding and dissolving in said aluminum alloy sufficient silicon to obtain between 7.5 to 20 percent silicon in the melt, cooling the melt to cause formation of one or more solid intermetallic crystalline phases lower in aluminum content than the remaining liquid aluminum alloy but higher than said scrap aluminum alloy in at least one of said impurities, further cooling the melt at such a rate and for sufficient time to cause coarsening of said crystalline phases while keeping them suspended in the liquid alloy, separating said coarsened crystals from said melt and recovering at least the remaining liquid aluminum alloy.

2. The method of claim 1, wherein said one or more intermetallic crystalline phases is separated from said remaining liquid aluminum alloy by centrifugation.

3. The method of claim 1, wherein said one or more intermetallic crystalline phases is separated from said remaining liquid aluminum alloy by filtration.

4. A method as defined in claim 1 wherein said cooling step is carried out by reducing the temperature of the melt by approximately 50°C per hour from the temperature at which the silicon dissolved down to at least 590°C.

5. A method as defined in claim 4 wherein said melt containing up to 20 percent silicon is maintained at the end of the cooling step for at least 30 minutes at a temperature of 585°–620°C.

* * * * *